United States Patent
Kenyon et al.

(10) Patent No.: US 9,140,456 B2
(45) Date of Patent: Sep. 22, 2015

(54) VARIABLE INITIATION LOCATION SYSTEM FOR PULSE DETONATION COMBUSTOR

(75) Inventors: Ross Hartley Kenyon, Niskayuna, NY (US); Justin Thomas Brumberg, Slippery Rock, PA (US)

(73) Assignee: General Electric Company, Niskayuna, NY (US)

( * ) Notice: Subject to any disclaimer, the term of this patent is extended or adjusted under 35 U.S.C. 154(b) by 844 days.

(21) Appl. No.: 13/308,577

(22) Filed: Dec. 1, 2011

(65) Prior Publication Data

US 2013/0139487 A1 Jun. 6, 2013

(51) Int. Cl.
*F23R 7/00* (2006.01)
*F02C 5/00* (2006.01)
*F02K 7/02* (2006.01)
*F02C 5/02* (2006.01)

(52) U.S. Cl.
CPC ... *F23R 7/00* (2013.01); *F02C 5/00* (2013.01); *F02K 7/02* (2013.01); *F02C 5/02* (2013.01)

(58) Field of Classification Search
CPC ............ F02C 5/00–5/04; F23R 7/00; F02K 7/02–7/075
USPC .............. 60/247, 39.38, 39.76, 772
See application file for complete search history.

(56) References Cited

U.S. PATENT DOCUMENTS

| | | | |
|---|---|---|---|
| 3,898,801 A * | 8/1975 | Grow | 60/247 |
| 5,413,478 A * | 5/1995 | Lang | 431/265 |
| 6,751,943 B2 * | 6/2004 | Meholic et al. | 60/204 |
| 6,813,878 B2 * | 11/2004 | Kraft | 60/247 |
| 6,877,310 B2 * | 4/2005 | Leyva | 60/247 |
| 7,047,724 B2 * | 5/2006 | Nordeen et al. | 60/226.1 |
| 7,055,308 B2 * | 6/2006 | Pinard et al. | 60/247 |
| 7,200,538 B2 * | 4/2007 | Parsons et al. | 703/7 |
| 7,669,405 B2 * | 3/2010 | Pinard et al. | 60/247 |
| 7,669,406 B2 * | 3/2010 | Tangirala et al. | 60/247 |
| 7,739,867 B2 * | 6/2010 | Kenyon et al. | 60/247 |
| 7,841,167 B2 * | 11/2010 | Rasheed et al. | 60/248 |
| 7,950,219 B2 * | 5/2011 | Tangirala et al. | 60/247 |
| 7,966,803 B2 * | 6/2011 | Chapin et al. | 60/39.76 |
| 8,443,583 B2 * | 5/2013 | Nalim et al. | 60/39.45 |
| 8,539,752 B2 * | 9/2013 | Brumberg et al. | 60/247 |
| 8,650,856 B2 * | 2/2014 | Brumberg et al. | 60/247 |
| 8,683,780 B2 * | 4/2014 | Shimo et al. | 60/247 |
| 2006/0260291 A1 * | 11/2006 | Vandervort et al. | 60/39.76 |
| 2007/0180810 A1 * | 8/2007 | Chapin et al. | 60/39.76 |
| 2008/0229756 A1 * | 9/2008 | Pinard et al. | 60/776 |
| 2010/0154380 A1 * | 6/2010 | Tangirala et al. | 60/39.27 |
| 2013/0081376 A1 * | 4/2013 | Reynolds et al. | 60/247 |

OTHER PUBLICATIONS

Glassman and Yetter, Combustion (2007), Elsevier Inc., Fourth Edition, Chapter 5, pp. 261-265.*

* cited by examiner

*Primary Examiner* — Phutthiwat Wongwian
*Assistant Examiner* — Jason H Duger
(74) *Attorney, Agent, or Firm* — John P. Darling (57) ABSTRACT

A pulse detonation combustor (PDC) includes a combustion tube, an inlet located on an upstream end of the combustion tube which receives a flow of a fuel/air mixture, an enhanced DDT region located within the tube downstream of the inlet, a nozzle disposed on a downstream end of the tube and a fortified region disposed downstream of the enhanced DDT region and upstream of the nozzle. A combustion initiation system that provides multiple initiation locations at different axial stations along the length of the tube are positioned downstream of the inlet and upstream of the fortified region. The initiator system is operable to initiate combustion of a fuel-air mixture within the tube at a selected one of the initiation locations.

16 Claims, 4 Drawing Sheets

VARIABLE INITIATION LOCATION SYSTEM FOR PULSE DETONATION COMBUSTOR

TECHNICAL FIELD

The systems and techniques described include embodiments that relate to techniques and systems for altering the location of deflagration-to-detonation transition within a pulse detonation combustor. They also include embodiments that relate to altering the ignition point for combustion within such a combustor.

BACKGROUND DISCUSSION

With the recent development of pulse detonation combustors (PDCs) and engines (PDEs), various efforts have been underway to use PDCs/PDEs in practical applications, such as combustors for aircraft engines and/or as means to generate additional thrust/propulsion in a post-turbine stage. These efforts have been primarily directed to the operation of the pulse detonation combustor, and not to other aspects of the device or engine employing the pulse detonation combustor. It is noted that the following discussion will be directed to "pulse detonation combustors" (i.e. PDCs). However, the use of this term is intended to include pulse detonation engines, and the like.

Typical operation of a pulse detonation combustor generates very high speed, high pressure pulsed flow, as a result of the detonation process. These peaks are followed by periods of significantly lower speed and lower pressure flow. Because the operation of pulse detonation combustors and the detonation process is known, it will not be discussed in detail herein. When a pulse detonation combustor is used in the combustion stage of a gas turbine engine, the pulsed, highly transient flow can produce significant pressure and heat at the location within the PDC tube at which the combustion transitions from ordinary combustion (deflagration) into a detonation. This may cause increased wear to the combustor at this particular location. Because of this, such a location that experiences repeated transitions may become a life-limiting factor for the operation of the combustor.

Therefore, in order to sustain long term operation of a PDC, it may be desirable to control the location at which such a transition occurs along the length of the combustor.

BRIEF DESCRIPTION

In one aspect of an embodiment of the systems described herein, a pulse detonation combustor (PDC) includes a combustion tube, an inlet located on an upstream end of the combustion tube which receives a flow of a fuel/air mixture, an enhanced DDT region located within the tube downstream of the inlet, a nozzle disposed on a downstream end of the tube and a fortified region disposed downstream of the enhanced DDT region and upstream of the nozzle. A combustion initiation system is also part of the PDC and provides multiple initiation locations, each of which is positioned at a different axial station along the length of the tube. The initiation locations are positioned downstream of the inlet and upstream of the fortified region. The initiator system is operable to initiate combustion of a fuel-air mixture within the tube at a selected one of the initiation locations.

In a further aspect the initiation location is chosen in order to position the detonation transition within the tube in a desired region, generally the fortified region. In another aspect the initiation location is chosen to result in no detonation taking place within the tube.

In yet another aspect of an embodiment described herein, the initiation system is configured to provide a continuously variable location for initiation of the combustion of the fuel/air mixture. In a further aspect, the initiation system includes a first electrode disposed within the tube, and a second electrode disposed adjacent the tube, at least one of the electrodes being selectively energizable along its length.

BRIEF DESCRIPTION OF DRAWING FIGURES

The above and other aspects, features, and advantages of the present disclosure will become more apparent in light of the subsequent detailed description when taken in conjunction with the accompanying drawings, wherein like elements are numbered alike in the several FIGs, and in which.

DETAILED DESCRIPTION

In a generalized pulse detonation combustor, fuel and oxidizer (e.g., oxygen-containing gas such as air) are admitted to an elongated detonation chamber, also referred to herein as a combustion tube, at an upstream inlet end. An ignitor is used to initiate this combustion process, and may also be referred to as an "initiator". Following a successful transition to detonation, a detonation wave propagates toward the outlet at supersonic speed causing substantial combustion of the fuel/air mixture before the mixture can be substantially driven from the outlet. The result of the combustion is to rapidly elevate pressure within the combustor before substantial gas can escape through the combustor exit. The effect of this inertial confinement is to produce near constant volume combustion.

As noted above, key to achieving the elevated pressure of the combustion is a successful transition from the initial combustion as a deflagration into a detonation wave. This deflagration-to-detonation (DDT) process begins when a fuel-air mixture in a chamber is ignited via a spark or other ignition source. The subsonic flame generated from the spark accelerates as it travels along the length of the tube due to various chemical and flow mechanics. As will be discussed below, various design elements within the combustion tube, such as flow obstacles of various descriptions, may be included in order to enhance the acceleration of the flame.

As the flame reaches critical speeds, "hot spots" are created that create localized explosions, eventually transitioning the flame to a supersonic detonation wave. The DDT process can take up to several meters of the length of the chamber, depending on the fuel being used, the pressure and temperature of the fuel/oxidizer mix (generally referred to as "fuel/air mix", although other oxidizers may be used), and the cross-section size of the combustion tube.

As used herein, a "pulse detonation combustor" is understood to mean any device or system that produces pressure rise, temperature rise and velocity increase from a series of repeating detonations or quasi-detonations within the device.

A "quasi-detonation" is a supersonic turbulent combustion process that produces pressure rise, temperature rise and velocity increase higher than pressure rise, temperature rise and velocity increase produced by a deflagration wave.

In addition to the combustion chamber or tube, embodiments of pulse detonation combustors generally include systems for delivering fuel and oxidizer, an ignition system, and an exhaust system, usually a nozzle. Each detonation or quasi-detonation may be initiated by various known techniques: such as external ignition, which may include a spark discharge, plasma ignition or laser pulse, or by gas dynamic processes, such as shock focusing, autoignition or by receiving flow from another detonation (cross-fire ignition).

As used herein, a detonation is understood to mean either a detonation or quasi-detonation. The geometry of the detonation combustor is such that the pressure rise of the detonation wave expels combustion products out of the nozzle, producing a thrust force, as well as high pressure within the exhaust flow. PDC's may include detonation chambers of various designs, including shock tubes, resonating detonation cavities and tubular, turbo-annular, or annular combustors. As used herein, the term "chamber" includes pipes having circular or non-circular cross-sections with constant or varying cross sectional area. Exemplary chambers include cylindrical tubes, as well as tubes having polygonal cross-sections, for example hexagonal tubes. In all examples described herein, combustion chambers of generally cylindrical tubular form will be discussed; however, it is understood that these tubes are merely exemplary, and that tubes of other cross sections that are not linear may also be used with the techniques and systems described herein.

Within the discussion herein, the terms "upstream" and "downstream" will be used to reference directions that are related to the flow path of the gas path through the PDC. Specifically, "upstream" will be used to reference a direction from which flow travels to a point, and "downstream" will be used to reference a direction from which flow travels away from a point. Therefore, for any given point within the system, flow will proceed from the locations found upstream of that point, to that point, and then to the locations downstream of that point. The terms may also be generally used to identify an "upstream end" and a "downstream end" of a PDC or other system containing fluid flow. Consistent with the use described above, an upstream end of a system is the end into which flow is introduced into the system, and the downstream end is the end from which flow exits the system.

Note that although local flow may include turbulence, eddies, vortices, or other local flow phenomenon that result in unsteady or circulating flow that is locally moving in a direction different than the overall direction that proceeds from upstream to downstream within the system, this does not alter the overall nature of the upstream to downstream flow path of the system as a whole. For instance, flow around obstacles located within the flow path to enhance DDT may produce wake flow that is not axial; however, the downstream direction remains defined by the axis of the overall bulk flow, which corresponds to the axis of the combustion tube.

Within the context of a generally tubular form, such as a combustion tube of a PDC (as will be discussed further below), the upstream and downstream directions will generally be along the central axis of the combustion tube, with the upstream direction pointing toward the intake end of the tube, and the downstream direction pointing toward the exhaust end of the tube. These directions which are generally parallel to the main axis of the tube may also be referred to as "axial" or "longitudinal" as these directions extend along the lengthwise axis.

Furthermore, with reference to the axial direction of the PDC combustion tube (or any other body having an elongated axis), a "radial" direction will refer to a direction that extends along lines that point either directly toward the axis (a "radially inward" direction) or directly away from the axis (a "radially outward" direction). Purely radial directions will also be normal to the axis, while angled radial directions may include both a radial and an upstream or downstream component.

A "circumferential" direction will be used to describe any direction that is perpendicular to a purely radial direction at a given point, and also has no axial component. Thus, the circumferential direction at a point is a direction that has no components parallel to either the axis or the radial direction through that point.

Figure 1:
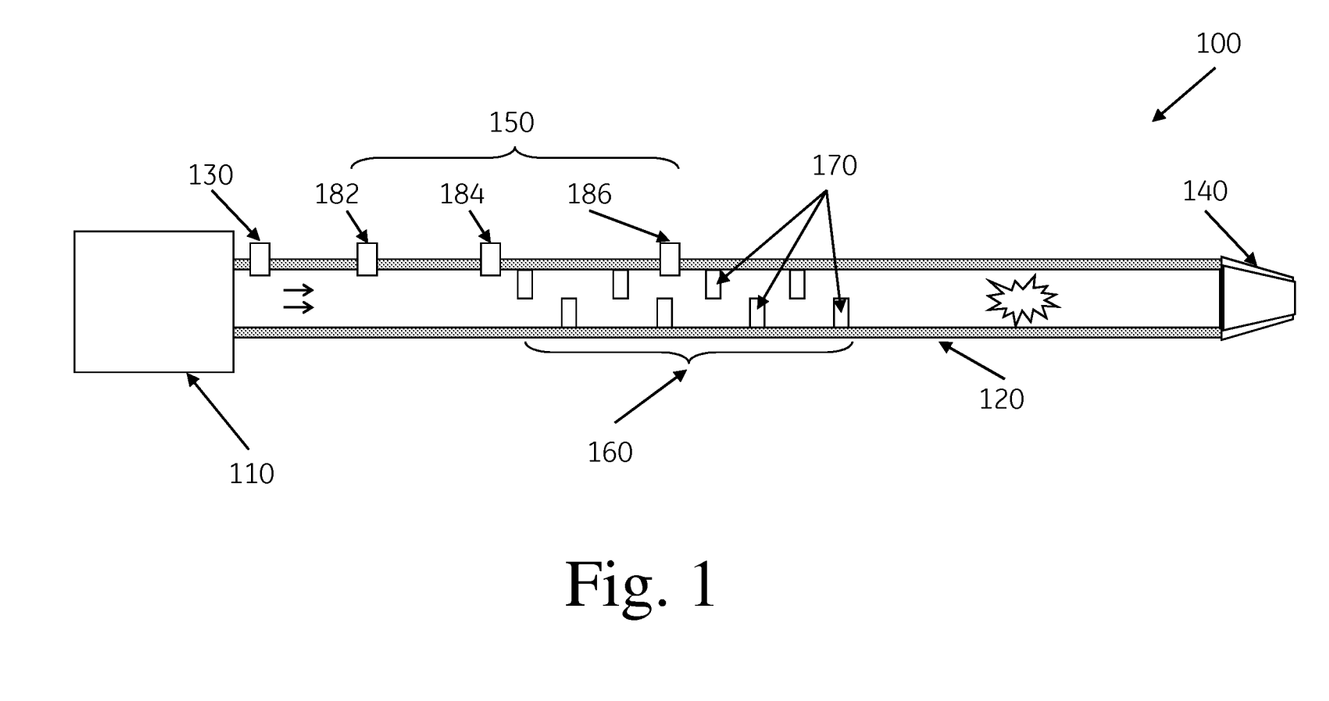
FIG. 1 is a schematic drawing showing an exemplary embodiment of a pulse-detonation combustor (PDC) having multiple ignition sources.

One embodiment of a PDC is shown in FIG. 1. The PDC 100 includes a valve 110 or other inlet on the upstream end of a combustion tube 120, also referred to as a combustion chamber, through which air or other oxidizer is introduced to the PDC during the fill phase of operation. Fuel is injected through an injector 130 near the upstream end of the combustion tube as well. Note that in alternate embodiments, fuel and oxidizer may be mixed upstream of the tube and both introduced together through the valve 110. The choice of whether to pre-mix or inject does not alter the nature of the discussion made herein, but may be varied based on the nature of the fuel to be used, its pressure, the form of the fuel (e.g.: atomized liquid, gas, vaporized liquid, etc.), and other factors.

The combustion tube 120 extends axially and ends in a nozzle 140, through which combustion products will exit the tube during operation. An initiation system 150, as discussed further below, is also included to begin the combustion within the fuel/air mixture. The tube is desirably long enough to allow sufficient space for the flame front of the combustion of the fuel/air mixture to accelerate and achieve DDT.

Although the length required to achieve transition to detonation may vary with various operating conditions (as will be discussed further below), it is generally desirable to add features to the design and operation of the tube that increase the rate at which the flame front accelerates. This helps to ensure that DDT is achieved within the tube during operating conditions. An enhanced DDT region 160 is shown in the combustion tube 120, generally located downstream of the introduction of fuel (whether by fuel injector 130 or by premixed flow through the valve 110) and at least part of the initiation system 150, but upstream of the nozzle 140.

The enhanced DDT region 160 in the embodiment illustrated in FIG. 1 includes a plurality of obstacles 170 that are disposed at various axial stations along the length of the tube 120 in the enhanced region. Such obstacles may take various forms as are known in the art, which may include but are not limited to: plates extending inwardly from the inner surface of the tube; bolts or other obstructions which extend radially inward from the surface of the tube; perforated plates or flow restrictions; surface texturing features, such as dimples, ridges or flanges; or spiral tubes that extend along the length of the enhanced region.

The enhanced DDT region 160 accelerates the flame front at a faster rate than the flame would accelerate in the absence of any obstacles, and thereby helps the combustion run-up to the speed necessary to achieve transition to detonation in less space (and time) than would be required in the absence of the enhanced region.

Such mechanisms provide the benefit of accelerating the flame front, but also generally have larger surface areas and less structural strength than the primary structure of the combustion tube. Because the durability of enhancements such as obstacles 170 is generally less than that of the tube 120 itself, the obstacles will become the life-limiting parts if not protected from the conditions associated with the transition to detonation, as will be discussed further below).

In addition to varying based on the size and configuration of the tube 120 and the specific fuel/oxidizer mix used, the amount of run-up necessary to produce DDT also varies based on factors such as the pressure and temperature of the fuel/air mix within the combustion tube. As the pressure is increased, the length of the run-up to DDT will decrease. Similarly, an increase in the temperature of the fuel/air mixture will decrease the run-up distance required.

During operation of a PDC 100 which is part of a larger system, such as a hybrid PDC-turbine powerplant for an aircraft, the PDC will be operated at a variety of speed and throttle settings. These will vary the pressure of the mixture being fed to the PDC, based on changes due to the ambient pressure varying from sea-level to flight altitude, as well as pressure changes due to the effectiveness of the compressor which feeds air to the PDC.

In a hybrid PDC-turbine engine, the compressor may be driven by turbines placed downstream of the combustor exhaust. Therefore, the amount of compression achieved is also affected by the power output of the turbine, reflected by the throttle settings for the engine. As a result, significant changes in the pressure and temperature of the mixture fed to the PDC 100 can be experienced as the engine is operated at conditions varying from ground idle (low power, high ambient pressure, low compression) to take-off power (high power, high ambient pressure, high compression) to high altitude cruise (moderate power, low ambient pressure, moderate compression), to idle descent (low power, low but increasing ambient pressure, low compression). Temperatures may also vary with altitude, as well as with the heat soak of the engine's components, and ram-air effects can alter the pressure of the mixture as well.

Because all of these operational factors can change the pressure and temperature of the fuel/air mixture being fed into the PDC, the amount of run-up required to reach detonation will vary during the operation of the PDC. As a result, the particular point at which detonation will be achieved will not always be at the same distance downstream from the point of which the mixture is ignited. The axial location downstream from ignition at which DDT occurs has been observed to vary by up to 1 foot when the pressure is increased from one atmosphere to twenty atmospheres, using the same tube and enhanced DDT regions.

At the point of transition to detonation, the pressure and heat produced in the combustion process are maximized. This results in this region of the tube experiencing higher mechanical loads than the remainder of the tube, including the region downstream of the transition point, even though the combustion wave may remain a detonation downstream from the point of DDT.

Instrumentation placed on the combustion tube have been used to observe strain in the combustion tube at the point of DDT that may be as high as five times higher than the strain associated with the theoretical pressure of a fully formed detonation. Although testing has indicated that the pressure falls away from this peak downstream of the transition point, downstream pressure may still be higher than the pressure expected for an ideal Chapman-Jouguet detonation. In addition to the higher pressure loading experienced at the point of DDT, experiments have shown that increased heating occurs at this point as well.

Because of the increased energy release at the transition point, the PDC is subjected to higher mechanical loading in the transition region. In order to compensate for the higher energy release in this region, techniques can be adopted to allow the PDC to better withstand these exceptionally high pressure and heat loads. In general, the techniques will be related to either physically strengthening the PDC tube in the region where the highest pressure loads will be experienced (as will be discussed below with regard to FIG. 2) or by increasing the ability of the PDC to dissipate excess heat where the highest heat loads will be experienced (as will be discussed below with regard to FIG. 3).

However, such fortifications of the PDC 100 generally require adding structure or cooling capability, which can increase the cost, complexity, and weight of the PDC. Therefore, it is generally desirable to provide such fortification in as small a region of the PDC as possible. In addition, the upstream advance of the transition point as pressure increases during operation can lead to DDT occurring within the enhanced DDT region 160 in tubes that do not provide for sufficient separation between the enhanced DDT region and the nozzle 140. Adding additional length to the PDC tube 120 is undesirable because of the associated weight such additional structure adds, as well as producing additional volume to fill during the fill phase, and additional tube through which pressure drops may occur. However, allowing the transition to occur within the enhanced DDT region is likely to damage the obstacles, surface features, or other enhancements within this region, resulting in poor performance, or an inability to achieve detonation at lower pressure operating conditions.

Because the run-up distance is constrained by the factors indicated above, the only way to adjust the detonation position within the PDC tube for a given set of input conditions is to change where the combustion run-up begins, i.e. to select a point of ignition for the combustion that results in a run-up to DDT that locates the transition within a desired region, generally the fortified region. Such techniques can also be used to ensure that detonation transition does not occur within the enhanced DDT region, as well being useful to produce quasi-detonations, if desired. In one embodiment, this is accomplished with an initiation system 150 having a plurality of initiators located at different axial stations within the combustion tube of the PDC.

Combustion initiation may be performed by a variety of techniques, as mentioned above. The initiation system illustrated in FIG. 1 has a plurality of individual initiators disposed at different points along the length of the tube 120. In the illustrated embodiment, the initiation devices, which are also referred to as ignitors, are spark ignitors, similar to those used as spark plugs in automotive engines. While such spark ignition is simple to control and drive, the techniques discussed with regard to this embodiment apply generally to any ignitor or initiation system that be placed at separate discrete locations within the tube.

As can be seen in the Figure, a first ignitor 182 is located at a point fairly far upstream along the tube 120, at an axial station downstream of the fuel injector 130, but well upstream of the enhanced DDT region 160. A second ignitor 184 is located just upstream of the enhanced DDT region, while a third ignitor 186 is located within the enhanced DDT region itself. It will be understood that such positioning can be varied, and additional ignitors might be located at additional stations along the tube without deviating from the principles described herein.

In operation, the PDC system 100 of FIG. 1 can use one or more of the ignitors 182, 184, 186 to start the combustion of the fuel/air mixture once the tube is sufficiently filled. For instance, in low pressure operation (for example, at initial power up from idle), run-up may take a longer distance, and therefore the use of the first initiator 182 located the farthest upstream within the tube 120 may be used to start the combustion. When higher pressure operation is called for (for example, operating at high power settings with maximum compression being provided by the compressor), the shorter run-up required allows the use of an initiator further downstream to still achieve complete transition to detonation at the desired location within the PDC combustion tube.

The availability of multiple initiators in such an embodiment also allows for the possibility of continued operation if one initiator is to fail, or if the particular operating point of the engine is best served by triggering multiple initiators simultaneously. These operating techniques may result in less efficient operation of the PDC than if no failure had occurred, but can allow operation to continue, rather than requiring the PDC to be shut down due to a single initiator failure.

As discussed above, use of different initiators under different operating conditions can be used to control the location of the transition to detonation within the PDC tube. In most situations, it will be most desirable to control this location such that it is made to occur within the region of the tube constructed to best handle the repeated increased stresses associated with the transition. This region, referred to as the "fortified region" herein, is shown in the embodiment illustrated in FIG. 2, as well as that shown in FIG. 3.

Figure 2:
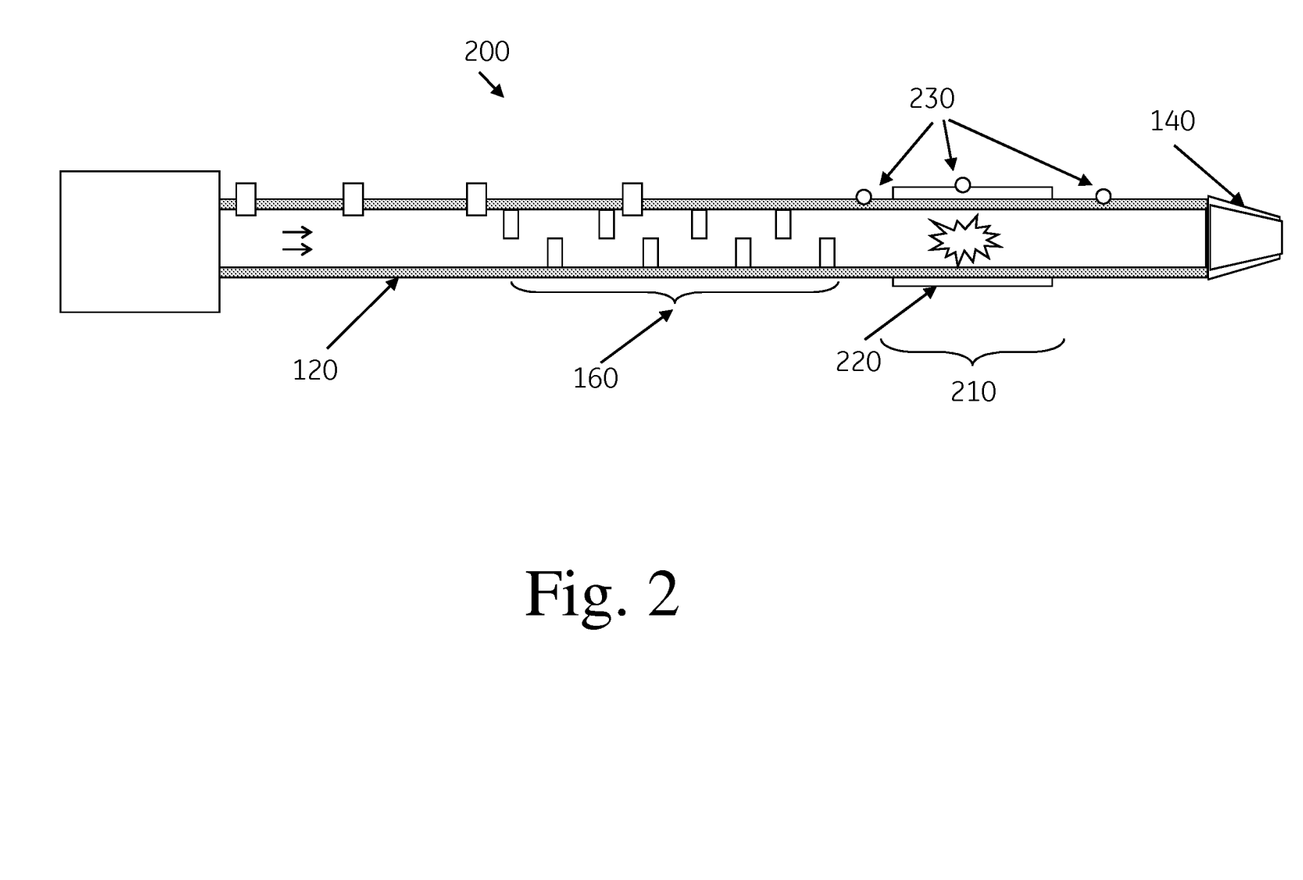
FIG. 2 is a schematic drawing showing an embodiment of a PDC as in FIG. 1 that has a fortified region that is physically reinforced.

FIG. 2 schematically shows an embodiment of a PDC 200 that includes the features shown in FIG. 1 and also identifies an area of local fortification positioned downstream of the enhanced DDT region 160 and upstream of the exhaust nozzle 140. This fortified region 210 may be set up in various ways to better resist the destructive effects that might be caused by the increased pressure and heat loads associated with the detonation transition.

As shown in the Figure, the fortified region 210 may contain an additional sleeve 220 of material that surrounds the combustion tube 120 in the fortified region and provides reinforcement against physical stresses. The additional thickness of material may also provide for increased capacity to absorb heat.

It will be recognized that alternative forms of structural reinforcement to the sleeve may also be used. These may include: discrete bands wrapped around the tube in place of the sleeve; a variation in cross-sectional thickness of the wall of the tube in the region being reinforced; longitudinal flanges extending along the outside of the reinforced region; variations in material composition that provide different strength, flexibility, or heat resistance in the reinforced region; and such other techniques as are known in the art.

Strain gauges 230 are also included and are disposed upon the combustion tube 120 at various locations along its length. These may be placed in regions near where transition to detonation is expected to occur. The strain gauges can be used to identify where the strain in the material of the tube is largest, and therefore to determine approximately where DDT is occurring. This information can be used to select the appropriate ignitor 182, 184, 186 to activate during operation in order to move the point of transition to the desired location and to maintain DDT within the fortified region 210 of the tube. In a particular embodiment, the strain gauges are generally disposed upon the outer surface of the combustion tube so as to protect them from the effects of the combustion and detonation waves within the tube.

Figure 3:
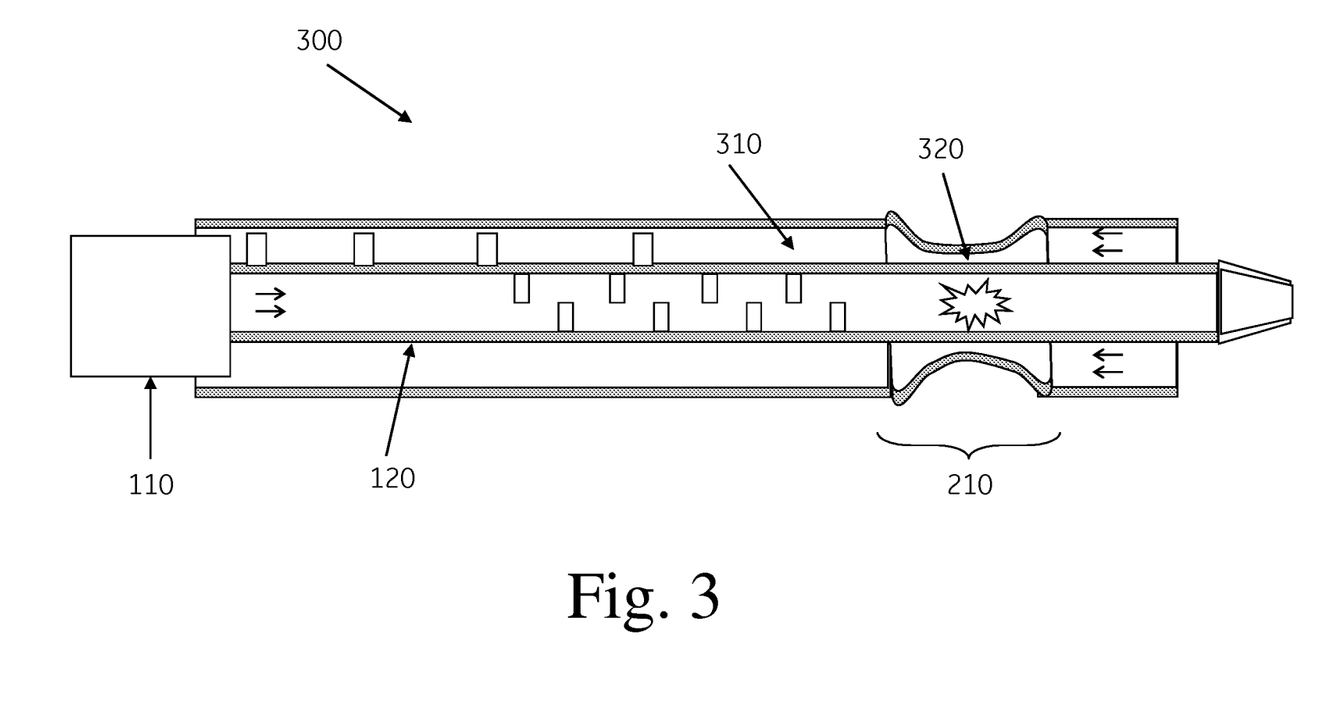
FIG. 3 is a schematic drawing showing an embodiment of a PDC as in FIG. 1 that has a fortified region that has enhanced cooling.

FIG. 3 shows a schematic view of a PDC 300 system that includes the features of FIG. 1 and a fortified region 210 that includes improved heat resistance. In the illustrated embodiment, the combustion tube 120 of the PDC 300 is disposed within a cooling fluid path 310. In operation, a cooling fluid with a lower temperature than the temperature of the wall of the combustion tube is passed through the fluid path in order to absorb heat from the tube and transfer the heat into the cooling fluid. In the illustrated embodiment, the cooling fluid path is a reverse-flow fluid path, i.e. the flow through the cooling fluid path is along the outside of the combustion tube in a direction which is upstream with respect to the combustion tube. Those of skill in the art will recognize that other cooling fluid path geometries may be used, and that a reverse-flow path is not required for effective operation of every possible embodiment.

In addition, the illustrated embodiment shows a reduced cross sectional area 320 of the cooling fluid path 310 in the fortified region 210. This reduced cross-sectional area increases the flow speed through this region, which increases the heat transfer from the combustion tube 120 to the cooling fluid in this area, and provides for a greater resistance to high heat for this portion of the tube. The reduced cross-sectional area also results in an increased pressure drop within the cooling fluid in this region, so it is desirable to minimize the portion of the cooling fluid path that has this reduced cross sectional area.

It will be appreciated that in the illustrated embodiment, the cooling fluid is air that is passed through the valve 110 into the PDC combustion tube 120 later on to be mixed with fuel and burned. Such a flow arrangement allows for extraction of heat from the combustion tube while also pre-heating the charge of air being input into the tube. This arrangement is not required in order to provide for a fortified region 210 with enhanced cooling, and other arrangements may be used as are known in the art.

For instance, in alternative embodiments, the cooling fluid may flow in a direction that is downstream with respect to the combustion tube along the outside of the combustion tube. In another alternative embodiment, the cooling fluid may be bypass air from elsewhere within the engine system, or air taken from the ambient flow around the engine. In further alternative embodiments, the cooling system could make use of liquid as a cooling fluid, or other cooling techniques could be applied as are known in the art.

In addition to the cooling fluid path having a reduced cross-section in the fortified region, other alternative embodiments may make use of surface features within the cooling fluid path in order to improve the heat transfer through the tube in this region. For instance, in an alternative embodiment, turbulators may be disposed on the outer surface of the combustion tube within the fortified region to increase the local flow voracity in this region in order to increase the heat transfer from the surface into the cooling fluid. Other alternative embodiments may use a flow path that has increased mass flow in the fortified region, or a separate cooling system with a greater heat transfer capacity for this region of the combustion tube.

In other alternative embodiments, ribbing on the outer surface of the tube, or fins disposed along the outer surface of the tube may be used to increase the surface area available for heat transfer into the cooling fluid. Still other alternative embodiments may make use of impingement cooling in this region, or additional cooling techniques as are known in the art.

In operation, the systems described herein operate on the basic PDC cycle: the tube 120 is filled with a mixture of fuel and air, air being introduced through a valve 110 or inlet and fuel through a fuel injector 130; the fuel/air mixture is ignited using the initiation system 150; the combustion propagates and accelerates through the mixture, transitioning into a detonation as it accelerates down the length of the combustion tube; the exhaust products are blown out of the exhaust end of the tube through the nozzle 140; and then a new charge of air is introduced into the tube to clear out any exhaust products and begin the fill process for the next detonation cycle.

In particular, in order to take advantage of the plurality of combustion initiation locations along the length of the tube, additional steps may be performed. In one embodiment, the strain gauges 230 (or other instrumentation) are used to determine the location along the length of the combustion tube 120 at which transition to detonation occurs for each cycle. Once that location is determined, it is possible to know whether detonation is occurring within the desired region of the combustion tube or not. This will generally be desired to occur within the fortified region, although in particular alternate embodiments, detonation could be desirable in other portions of the tube for particular operating conditions, for example, in the throttling embodiment described below.

If detonation transition is not occurring within the desired region, a different initiation location may be selected that adjusts the starting point of the run-up to detonation in order to relocate the detonation of a subsequent cycle within the desired region. For instance, if detonation is being detected moving further upstream and outside of the fortified region 210, initiation of a subsequent cycle may be made using an ignitor that is located at a further downstream location within the tube in order to shift the detonation back into the fortified region.

In other embodiments, the system may use a control map that identifies the appropriate initiation location to be used for a variety of operating conditions and parameters. These can include the pressure and temperature of the fuel/air mixture, the power or throttle setting requested for the PDC (or the engine as a whole), the operational status of various portions of the system, such as the ignitors and the obstacles in the enhanced DDT region, and the ambient temperature and strain history of specific regions within the combustion tube.

In practice, these techniques may be combined to provide both a control map for default settings, as well as a closed-loop system that responds to particular conditions within the engine. For instance, while an ignition location might be chosen based on the control map in order to locate transition within the fortified region based on the operating conditions, the choice of ignition location may be varied slightly around this base position in order to spread out the peak stress and thermal load in subsequent cycles. In this way, wear along the length of the fortified region may be evened out so as to prevent a pre-mature failure in one portion of the system due to extended periods of time being spent in a particular operating mode that places the DDT at a single location.

Techniques such as those described above can be used to improve the operational lifetime of the PDC and its components. By keeping the detonation transition within those portions of the tube best able to survive the additional stresses and heat imposed by the DDT, the overall life of the PDC is improved. Furthermore, even within fortified regions, the periodic relocation of the transition point can reduce the repeated stresses felt by any one point within the region, prolonging the life of the fortified region as well. In addition, by detecting when detonation is not occurring properly, or is happening in portions of the tube that can be damaged by detonations, for instance the enhanced DDT region, those regions are protected from wear that would otherwise reduce the operational life of those components as well.

In addition to improving the operational life of various components, the techniques described herein can be used to produce a throttling effect across multiple tubes. For instance, there may be operating conditions in which it is or desirable to achieve only a quasi-detonation (an accelerated flame front at a higher speed and pressure than a deflagration, but less than the Chapman-Jouguet detonation pressure achieved by a fully shock-driven combustion front) rather than a full detonation. In these conditions, using an ignition location that is further downstream than that which would result in transition within the combustion tube will result in no actual DDT, and therefore will eliminate the increased energy release (and its heat and pressure peaks) at that point associated with the transition. This helps to preserve the life of the mechanical systems, while still providing an increase in efficiency over a pure deflagration system.

In such operating modes, the systems and techniques described herein can be used to make sure that an ignition station far enough downstream is selected that no detonation peak is achieved before the flow is blown out through the nozzle. This reduces the energy of the exhaust gas flow, and can therefore be used as a throttling mechanism that would not be possible with a single ignition location along the length of the tube. Such operating modes may also be beneficial for use when temperature limits in the fortified region of the tube are exceeded, and a temporary reduction in heat release into the tube is required. This technique does not require altering the fill-fraction of the combustion tube.

In operation, a single engine may have multiple tubes, all firing into a single turbine located downstream of the PDC nozzles. The techniques described herein, and the systems described with respect to a single PDC, may be applied to each PDC within a multiple tube system. This may provide advantages not just in positioning the detonation of each of the tubes in the same manner as the other tubes for a given operating point, but for having different tubes operate in such a way to achieve their detonations at slightly different points. This can be significant for controlling vibration or resonance effects, as well as distributing the heat and thermal loads of the transition point across a broader length of the engine.

For instance, in a system having a plurality of tubes, not all tubes need be operated to produce DDT at the same location. This may be used to allow shared fortifications (such as cooling) to be more effectively distributed among the various tubes. The throttling techniques described above may also be used on some tubes and not others within the cycle in order to allow an over-stressed tube to be cooled while still operating.

It will be recognized that although the systems are described above with respect to the particular embodiments illustrated in the Figures, that various alternatives to the specific configurations illustrated can be used. For instance, although the spark initiators in FIG. 1 have been illustrated as all having the same circumferential station in the combustion tube (i.e., they are all shown as descending from the top of the tube), the initiators can be distributed at various circumferential positions around the tube, as may be desirable for packaging reasons.

In addition, it may be desirable to place multiple initiators at the same axial station along the tube in order to provide redundancy or improved ignition performance. In some embodiments the ignitors at the same axial station may be triggered simultaneously in order to distribute the ignition kernels within the tube. In other embodiments, the ignitors at a single station may be used separately. In other embodiments, it may be desirable to use more than one ignition location within a single detonation cycle to address damage to some of the ignitors or to help speed up the acceleration of the flame front.

The placement of initiators within the enhanced DDT region, especially for high pressure operation, may also be desirable in certain embodiments and operating techniques.

Variations in placement within the enhanced DDT region are also possible. For instance, in some embodiments, placement of an initiator in the wake of a flow obstacle within the enhanced DDT region may be useful to achieve ignition with lower ignitor power, as well as providing protection from the direct impact of the propagating flame front on the initiator, which may improve the operating lifetime of those initiators located within the combustion region.

Figure 4:
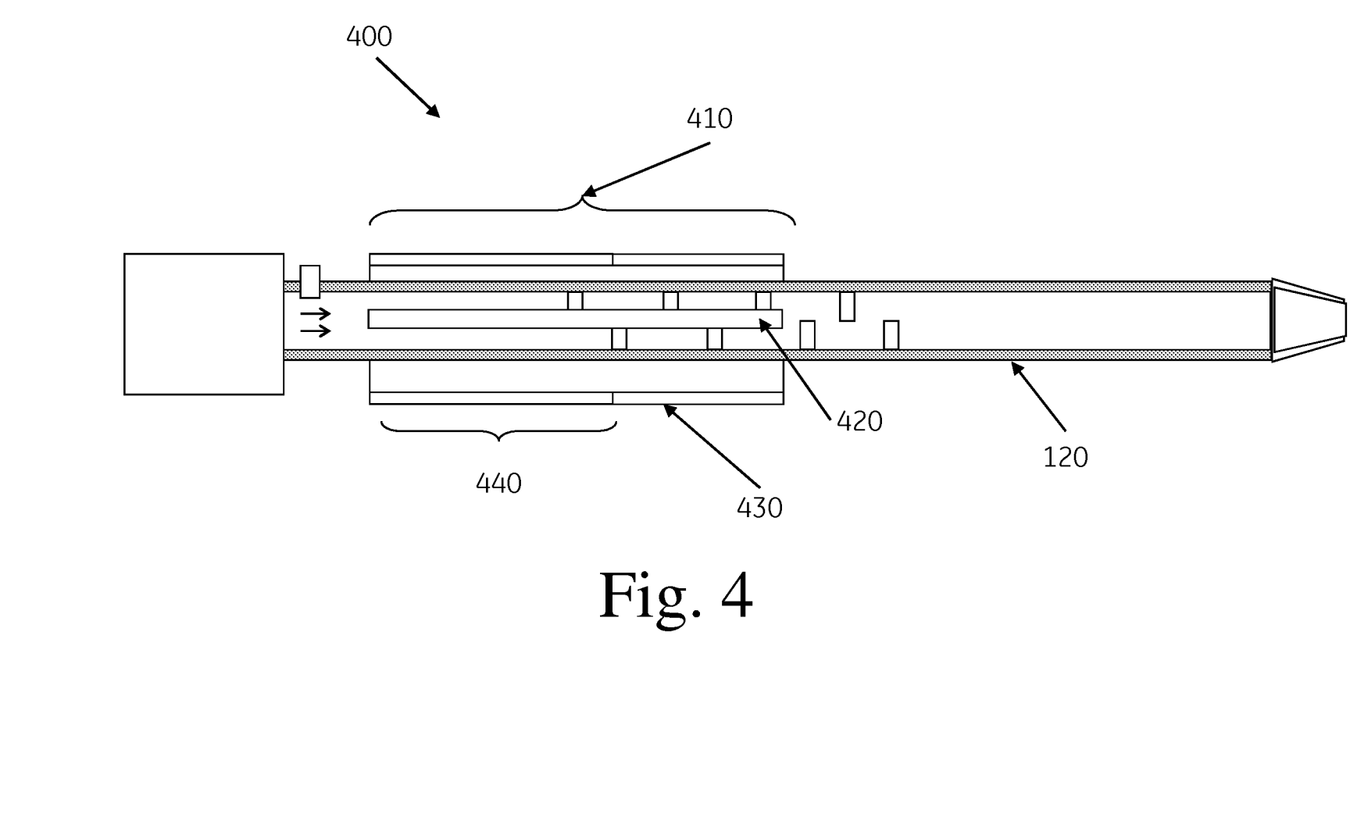
FIG. 4 is a schematic drawing showing an exemplary embodiment of a PDC that has a continuously variable ignition region.

An alternate embodiment for an initiation system that can provide a continuously variable location for ignition along the length of the initiator is illustrated in schematic form in FIG. 4. The PDC systems described with respect to FIGS. 1-3 showed an initiation system 150 that made use of individual initiators, specifically spark ignitors, each of which were disposed at discrete locations along the axial length of the tube. However, other ignition systems may be configured to provide for a variable initiation location that is not limited to discrete locations, but can be varied continuously within a region.

In the embodiment of a PDC 400 illustrated in FIG. 4, a plasma initiation system 410 is illustrated that would provide such a feature. Although the other features of FIG. 1 are present in essentially the same manner, the individual ignitors are replaced with a pair of plasma electrodes: an inner electrode 420 disposed generally centrally within the combustion tube 120; and an outer electrode 430 that is disposed along the wall of the combustion tube. Both electrodes extend over an axial length of the PDC. At least one of the electrodes is able to be partially energized so that only a portion of its length is charged. Although not required for the operation described herein, this is easier to achieve with the outer electrode by forming it from a plurality of coils that spiral along the tube, and which can be electrically connected to the control system at a variety of positions. By energizing more coils along the outer electrode, a control system can effectively energize as much or as little of the outer electrode as is desired.

Because the plasma initiator 410 works by creating a highly ionized region where a plasma can form, the initiator will only create the desired plasma between the energized portions of the two electrodes. Energizing only a portion of the outer electrode will allow the control system to position the plasma between the energized portion of the outer electrode 440, and the nearest portion of the inner electrode 420. In this way, the control system can locate the plasma, and therefore the combustion ignition of the fuel/air mixture, anywhere along the energizable length of the electrodes.

This embodiment can provide a more precise degree of control over the selected initiation location, and can be especially effective when a small variation in ignition point is desired, for instance to fine tune operation around a base operating point, or to produce small variations in the detonation point to limit continuous over-stress to a single point within the fortified region.

The various embodiments described herein may be used to provide improvements in operating life and efficiency for PDCs. They may also be used to provide for a more flexible control environment for operation of a PDC. Any given embodiment may provide one or more of the advantages recited, but need not provide all objects or advantages recited for any other embodiment. Those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description may enable those of ordinary skill in the art to make and use embodiments having alternative elements that likewise correspond to the elements of the invention recited in the claims. The scope of the invention thus includes structures, systems and methods that do not differ from the literal language of the claims, and further includes other structures, systems and methods with insubstantial differences from the literal language of the claims. While only certain features and embodiments have been illustrated and described herein, many modifications and changes may occur to one of ordinary skill in the relevant art. Thus, it is intended that the scope of the invention disclosed should not be limited by the particular disclosed embodiments described above, but should be determined only by a fair reading of the claims that follow.

What is claimed is:

1. A method of operating a pulse detonation combustor (PDC) having a combustion tube, an inlet disposed on an upstream end of the combustion tube, an enhanced deflagration-to-detonation (DDT) region located within the combustion tube downstream of the inlet, a nozzle disposed on a downstream end of the combustion tube, a fortified region disposed downstream of the enhanced DDT region and upstream of the nozzle, and a combustion initiation system providing a plurality of initiation locations along an axial length of the combustion tube, the method comprising:
   providing a flow of a fuel/air mixture to the combustion tube via the inlet;
   activating the combustion initiation system at a selected initiation location of the plurality of initiation locations along the length of the combustion tube to ignite the fuel/air mixture within the combustion tube at the selected initiation location, in order to select a detonation region at which combustion of the fuel/air mixture transitions to a detonation, wherein the detonation region is the fortified region of the combustion tube;
   detecting a location of a transition to detonation of a previous combustion;
   adjusting the selected initiation location at which to activate the combustion initiation system based on the detected location of the transition to detonation of the previous combustion; and
   exhausting combustion products from the combustion tube through the nozzle.

2. The method of claim 1, wherein the combustion initiation system comprises a plurality of initiators, at least one which is disposed at each of the plurality of initiation locations, and activating the combustion initiation system comprises using the at least one initiator located at the selected initiation location.

3. The method of claim 2, wherein at least one of the plurality of initiators is disposed upstream of the enhanced DDT region and at least one of the plurality of initiators is disposed within the enhanced DDT region.

4. The method of claim 1 wherein the combustion initiation system comprises a first electrode disposed within the combustion tube and extending at least from a furthest upstream initiation location of the plurality of initiation locations to the a furthest downstream initiation location of the plurality of initiation locations, and a second electrode disposed adjacent to the combustion tube, and activating the combustion initiation system comprises charging the first and second electrodes to opposite electrical polarities and selectively charging at least one of the first and second electrodes only in the selected initiation location.

5. The method of claim 1, wherein detection of the location of the transition to detonation of the previous combustion comprises measuring a strain in the combustion tube at multiple locations along the length of the combustion tube.

6. The method of claim 1, further comprising:
varying the selected initiation location based on at least one of a pressure of the fuel air mixture and a temperature of the fuel air mixture.

7. The method of claim 1, further comprising:
varying the selected initiation location based on a commanded throttle setting for the PDC.

8. The method of claim 1, wherein no detonation of the fuel/air mixture occurs within the combustion tube.

9. The method of claim 1, further comprising:
adjusting the selected initiation location at which to activate the combustion initiation system in order to compensate for a peak stress or thermal load.

10. The method of claim 9, wherein the peak stress or thermal load results in reduced effectiveness of the enhanced DDT region in accelerating combustion of the fuel/air mixture.

11. The method of claim 1, further comprising:
flowing a cooling fluid through a cooling fluid path of a cooling system, wherein the cooling system is disposed along at least a portion of the length of the combustion tube that includes the fortified region, and the cooling fluid path is in contact with an outer wall of the combustion tube.

12. The method of claim 11, wherein the cooling fluid path has a smaller cross section at the fortified region compared to the a cross section of the fluid cooling path both upstream and downstream of the fortified region.

13. The method of claim 11, wherein a mass flow of cooling fluid passing through the cooling fluid path at the fortified region is greater compared to a mass flow of cooling fluid passing through the cooling fluid path both upstream and downstream of the fortified region.

14. The method of claim 11, wherein surface features are disposed within the cooling fluid path at the fortified region.

15. The method of claim 14, wherein the surface features are fins disposed upon the outer wall of the combustion tube.

16. The method of claim 14, wherein the surface features are ribs disposed upon the outer wall of the combustion tube.

* * * * *